(12) United States Patent
Fröhlich et al.

(10) Patent No.: US 10,654,123 B2
(45) Date of Patent: May 19, 2020

(54) METHOD FOR MANUFACTURING A SANDWICH PANEL

(71) Applicant: Outokumpu Oyj, Helsinki (FI)

(72) Inventors: Thomas Fröhlich, Ratingen (DE);
Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 357 days.

(21) Appl. No.: 15/536,971

(22) PCT Filed: Dec. 17, 2015

(86) PCT No.: PCT/EP2015/080298
§ 371 (c)(1),
(2) Date: Jun. 16, 2017

(87) PCT Pub. No.: WO2016/097186
PCT Pub. Date: Jun. 23, 2016

(65) Prior Publication Data
US 2017/0348789 A1  Dec. 7, 2017

(30) Foreign Application Priority Data
Dec. 18, 2014 (EP) ..................... 14198825

(51) Int. Cl.
*B23K 9/28* (2006.01)
*B23K 11/11* (2006.01)
(Continued)

(52) U.S. Cl.
CPC ............ *B23K 11/11* (2013.01); *B23K 10/022* (2013.01); *B23K 11/067* (2013.01); *B23K 11/16* (2013.01);
(Continued)

(58) Field of Classification Search
CPC ............ B23K 2103/00; B23K 2103/16; B23K 2103/172; B23K 2103/04; B23K 2103/05;
(Continued)

(56) References Cited

U.S. PATENT DOCUMENTS 7,752,729 B2   7/2010   Faehrrolfes et al.
8,796,580 B2   8/2014   Mizrahi
(Continued)

FOREIGN PATENT DOCUMENTS

DE   102011109708 A1   2/2013
DE   102011054362 A1   4/2013
(Continued)

OTHER PUBLICATIONS

Ishida, Ryuichi et al., To Obtain an Excellent Spot Weldability Composite Metal Plate and Method for Production Thereof, JP 4-223157 A (Year: 1992).*
(Continued)

*Primary Examiner* — Hung D Nguyen
(74) *Attorney, Agent, or Firm* — The Webb Law Firm

(57) ABSTRACT

The invention relates to a method for manufacturing a sandwich panel as a semi-finished product where at least one layer of a non-metallic material is positioned between at least two metallic layers. At least one of the metal layers is shaped into a three dimensional layer, and the metal layers are in direct mechanical contact to enable resistance weldability of the semi-finished product in order to connect the semi-finished product to a desired combination of solutions in a subsequent manufacturing process.

17 Claims, 1 Drawing Sheet

(51) Int. Cl.
| | |
|---|---|
| *B32B 7/05* | (2019.01) |
| *B32B 7/12* | (2006.01) |
| *B32B 15/08* | (2006.01) |
| *B32B 3/28* | (2006.01) |
| *B32B 37/00* | (2006.01) |
| *B32B 37/14* | (2006.01) |
| *B32B 37/22* | (2006.01) |
| *B23K 26/32* | (2014.01) |
| *B32B 3/30* | (2006.01) |
| *B32B 15/00* | (2006.01) |
| *B23K 11/16* | (2006.01) |
| *B32B 27/06* | (2006.01) |
| *B32B 37/04* | (2006.01) |
| *B32B 3/26* | (2006.01) |
| *B32B 7/02* | (2019.01) |
| *B32B 33/00* | (2006.01) |
| *B23K 26/21* | (2014.01) |
| *B23K 26/323* | (2014.01) |
| *B23K 10/02* | (2006.01) |
| *B23K 11/06* | (2006.01) |
| *B23K 11/20* | (2006.01) |
| *B23K 26/322* | (2014.01) |
| *B23K 26/324* | (2014.01) |
| *B32B 15/18* | (2006.01) |
| *B32B 15/20* | (2006.01) |
| *B23K 11/10* | (2006.01) |
| *B23K 103/04* | (2006.01) |
| *B23K 103/10* | (2006.01) |
| *B23K 103/12* | (2006.01) |
| *B23K 103/08* | (2006.01) |
| *B23K 103/18* | (2006.01) |
| *B23K 103/00* | (2006.01) |
| *B23K 103/16* | (2006.01) |

(52) U.S. Cl.
CPC ............ *B23K 11/20* (2013.01); *B23K 26/21* (2015.10); *B23K 26/32* (2013.01); *B23K 26/322* (2013.01); *B23K 26/323* (2015.10); *B23K 26/324* (2013.01); *B32B 3/266* (2013.01); *B32B 3/28* (2013.01); *B32B 3/30* (2013.01); *B32B 7/02* (2013.01); *B32B 7/05* (2019.01); *B32B 7/12* (2013.01); *B32B 15/00* (2013.01); *B32B 15/08* (2013.01); *B32B 15/18* (2013.01); *B32B 15/20* (2013.01); *B32B 27/06* (2013.01); *B32B 33/00* (2013.01); *B32B 37/0084* (2013.01); *B32B 37/04* (2013.01); *B32B 37/144* (2013.01); *B32B 37/223* (2013.01); *B23K 2103/04* (2018.08); *B23K 2103/05* (2018.08); *B23K 2103/10* (2018.08); *B23K 2103/12* (2018.08); *B23K 2103/15* (2018.08); *B23K 2103/16* (2018.08); *B23K 2103/172* (2018.08); *B23K 2103/18* (2018.08); *B23K 2103/42* (2018.08); *B32B 2250/03* (2013.01); *B32B 2250/40* (2013.01); *B32B 2307/30* (2013.01); *B32B 2307/546* (2013.01); *B32B 2419/04* (2013.01); *B32B 2607/00* (2013.01)

(58) Field of Classification Search
CPC ............ B23K 2103/10; B23K 2103/12; B23K 2103/15; B23K 2103/18; B23K 2103/42; B23K 11/067; B23K 11/11; B23K 11/16; B23K 11/20; B23K 26/21; B23K 26/32; B23K 26/322; B23K 26/323; B23K 26/324; B23K 10/022; B32B 7/02; B32B 7/05; B32B 7/06; B32B 7/12; B32B 37/04; B32B 37/0084; B32B 37/144; B32B 37/223; B32B 15/00; B32B 15/08; B32B 15/18; B32B 15/20; B32B 3/266; B32B 3/28; B32B 3/30; B32B 33/00; B32B 2250/03; B32B 2250/40; B32B 2307/30; B32B 2307/546; B32B 2419/04; B32B 2607/00; B32B 27/06; B23B 37/0084; B23B 37/144; B23B 37/223; B23B 2307/30; B23B 2307/546
USPC ... 219/78.11, 78.12, 80, 83, 86.1, 91.2, 118, 219/137 R
See application file for complete search history.

(56) References Cited

U.S. PATENT DOCUMENTS

| | | | |
|---|---|---|---|
| 2010/0040902 A1* | 2/2010 | Mizrahi | B23K 11/11 428/600 |
| 2013/0273387 A1 | 10/2013 | Kleier et al. | |
| 2014/0120364 A1* | 5/2014 | Peca | B23K 26/22 219/121.63 |
| 2014/0224774 A1 | 8/2014 | Chergui et al. | |
| 2014/0298875 A1 | 10/2014 | Chergui | |
| 2015/0202844 A1 | 7/2015 | Böger et al. | |
| 2015/0336143 A1 | 11/2015 | Krautschick et al. | |
| 2015/0336356 A1 | 11/2015 | Pogadetz-Kiehl et al. | |

FOREIGN PATENT DOCUMENTS

| | | | |
|---|---|---|---|
| FR | 2709083 | A1 | 2/1995 |
| JP | 55106692 | A | 8/1980 |
| JP | 1127125 | A | 5/1989 |
| JP | 278541 | A | 3/1990 |
| JP | 4223157 | A | 8/1992 |
| JP | 2006305591 | A | 11/2006 |
| WO | 2004002646 | A1 | 1/2004 |
| WO | 2008125228 | A1 | 10/2008 |
| WO | 2011082128 | A1 | 7/2011 |
| WO | 2012150144 | A1 | 11/2012 |
| WO | 2013156167 | A1 | 10/2013 |
| WO | 2014001152 | A1 | 1/2014 |
| WO | 2014009114 | A1 | 1/2014 |
| WO | 2014096180 | A1 | 6/2014 |

OTHER PUBLICATIONS

Kempf; Dissertation titled "Entwicklung einer mechanischen Verbindungstechnik für Sandwichwerkstoffe" ("Development of a mechanical joining method for sandwich materials)"; Dec. 2, 2004; Relevance: see citation in specification of the present application, p. 5, lines 19-27.

Lange; Dissertation titled "Beitrag zum Umformverhalten von dreischichtigen austenitischen Sandwichverbunden mit polymerer Kemschicht" ("Contribution to the forming behavior of three-layer austenitic sandwich composite with polymer core material") Dec. 20, 2005; Relevance: see citation in specification of the present application, p. 5, lines 19-27.

Tata Steel data sheet; "Coretinium—A unique and durable composite solution that delivers light-weight products and design innovation. "; 2015.

\* cited by examiner

METHOD FOR MANUFACTURING A SANDWICH PANEL

CROSS-REFERENCE TO RELATED APPLICATIONS

This application is the United States national phase of International Application No. PCT/EP2015/080298 filed Dec. 17, 2015, and claims priority to European Patent Application No. 14198825.3 filed Dec. 18, 2014, the disclosures of which are hereby incorporated in their entirety by reference.

BACKGROUND OF THE INVENTION

Field of the Invention

The present invention relates to a method for manufacturing a sandwich panel as a semi-finished product where a layer of a non-metallic material is positioned in recess spaces between the metal layers of which one is essentially flat metal layer and the other one a three-dimensionally profiled metal layer in a way that the subsequent processing industry can directly use the semi-finished product for welding processes.

Description of Related Art

Sandwich panel structures can be fabricated from a wide variety of metallic, polymeric or composite materials. Many sandwich panel structures are found to reduce weight as well as noise and to provide adequate stiffness and strength for a structural load support. Sandwich panels with the core relative densities of 2-10% and cell sizes in the millimeter range are assessed for use as multifunctional structures. The open and three-dimensional pore networks of lattice supporting structures create opportunities for simultaneously supporting high stresses and also cross flow heat exchange. Because of the mentioned advantages, especially the light-weight and stiffness properties, sandwich panel structures are interesting for a wide range of the processing industry like automotive engineering, engineering of commercial, agricultural as well as railway vehicles, ship and building constructions or containers. But often complex manufacturing processes are necessary and cost-efficient and process-efficient methods, established and well-trained for monolithic metallic sheets like steel, are not possible to use. This applies particularly for welding processes like the resistance welding.

For the resistance welding in general and spot welding as one method for resistance welding processes specifically, the physical law of Joule for resistance heating is used. That means the transformation of electrical energy into ohmic resistance and then further into thermal energy. That means for a spot welding process that a current flows in an electric circuit. The machine parts are made of copper to have a good current transmission with low resistance and a low heat loss. At the transition points from the copper to the metallic sheets, between the sheets and from the second sheet to the copper, the current energy is changed to ohmic resistances. Because of the effect, that the transition resistance between the two sheets is by far the highest, the thermal energy is at this point the highest, too. At the end the thermal energy at this point reach the melting temperature of the sheets and a weld point or called weld nugget results. The formula for the thermal energy is: $Q=I_S^2*t*R$ with $I_S$ as the welding current, t=welding time and R=sum of all resistances. When working with state-of-the-art sandwich panel structures, there is at least one isolating non-metallic material. Because of this, the electric circuit is not closed and therefore no thermal energy which melts the sheets together can be created.

Typical sandwich panels with a flat order of the different layers are mentioned in the WO publications 2014009114A1, 2014001152A9, and 2013156167A1 or the Tata steel data sheet "Coretinium®—A unique and durable composite solution that delivers light-weight products and design innovation". Further, the WO publications 2008125228A1 and 2004002646A1 describe a method for manufacturing a metallic sandwich structure wherein the different layers are bonded together. All these WO publications have the same disadvantage of having an isolating material between the metallic outer-layers which results in a non-resistance-weldability.

The JP publication H01-127125 describes a method for manufacturing a sandwich panel containing two sheet metal layers and one corrugated element. Spot welding is used to fit the first sheet metal layer to one surface of a corrugated strip. Then a bonding tape process follows. A pair of press roller machines is used to fit the second sheet metal layer to the second surface of the corrugated strip by pressurizing and bonding. The disadvantage of the resulting semi-finished product is the fact that the subsequent processing industry like car body manufacturer cannot use these kind of sandwich products for further resistance welding processes to join this sandwich panel with other car body sheets, plates or formed components together. The reason is that the mentioned strip works as an isolator for the electric circuit in a resistance welding process. No weld nugget and therefore no connection can be created.

The JP patent publication H0278541A describes a method how to produce a sandwich structure wherein recessed parts are produced on the outside surface of one metal sheet in a laminate formed by interposing resin. It is worked out that the distance between the tip of the projected part and the inside surface of the other metal sheet are specified with the distance. That means, in spite of using a profiled outer-layer steel sheet, there will be at the end a defined isolating gap between both metal sheets which results in a not-resistance weldable configuration.

The US patent application 2013-273387 relates to high-frequency welding of sandwich metal sheets. Accordingly, a first composite sheet metal part comprising at least two metal sheets and a sheet arranged between both metal sheets that consists of a material with a different composition than the two metal sheets is welded to a second sheet metal part consisting of a solid metallic material or a further composite material with at least two metal sheets and a sheet arranged between the metal sheets that consists of a material with a different composition than the two metal sheets.

A method how to weld sandwich panels with resistance spot welding is mentioned in the WO publication 2011082128A1 wherein the composite core material of a sandwich panel is layered by two metallic outer-layers. The target of creating specific resistance weldability is solved by having a plurality of steel fibers in the core-layer which arrange the electrical communication with the outer-layer steel sheets. One disadvantage is the reproducibility and repeatability of welding results. There is no guarantee to have the right and sufficient numbers of steel fibres in contact when a subsequent manufacturer wants to use the welding parameters. There is a big danger to create weld spatters in the contact areas of the steel-fibre with the steel outer-layers and to burn the non-metallic parts around it. Additional to the softening and displacing of the non-metallic interlayer, also and described in detail in the following publications, is mentioned as one way to solve the target.

To bypass the disadvantage of non-resistance-weldable sandwich structures, there are different patents which describe processes and methods how to make a sandwich structure in a specific further process weldable, which is in the initial, semi-finished product, delivery status configuration not weldable. One example is the JP publication 2006305591A where two metallic outer-layers overlapped on both surfaces with a thermoplastic resin insulating board. The target of bringing the two metallic layers into directly contact is solved by softening the resin insulating board and by pushing it away outward the welding position. The both welding electrodes must be in a heated state which is cost extensive, needs special equipment for the manufacturers and is not established in the subsequent process industry. Another specific way how to make a not-resistance weldable sandwich product in specific configuration weldable with an additional process step during component manufacturing is the DE publication 102011054362A1. The task is solved by heating the plastic core layer in a first process step and then to give a force with at least one electrode to the sandwich surface in a second process step. The non-metallic softened interlayer will be displaced from the force-loaded position and the both metallic outer-layers get into contact. Both steps are additional process steps during a component manufacturing, needs additional production time, increase manufacturing costs and drop the clock cycles. Further, it is mentioned that this solution only works for a specific border area of the component. The same additional process steps are worked out by the DE publication 102011109708A1 which describes also a subsequent process to make a sandwich structure weldable where the both metallic outer-layers are not in directly contact in the initial state. The FR publication 2709083A1 describes a typical sandwich panel with two metallic outer-layer sheets and a non-metallic core material which isolates the two outer-layers. To reach a specific weldability the same approach like in the DE publication 102011054362A1 is used: to soften and displace the non-metallic core material at the border area of the sheets.

Another extensive and complex way to create an electric circuit for a non-resistance weldable sandwich panel is described in the WO publication 2012150144A1. The task here is to build an electric bridge with additional machine parts to bypass the isolating polymer material and to reach a weldability of the sandwich with other sheets. A very extensive hardware which restricts the accessibility to the sheets, needs additional time to install and to position at the right place. This increases the production costs. Especially for formed and big parts it will be problematical to create the electric contact with the problem of undefined current flow.

There are further literature sources such as dissertations which search for other joining methods instead of resistance welding. Alexander Kempf wrote his dissertation about the topic "Development of a mechanical joining method for sandwich materials" at RWTH Aachen in 2004. In the dissertation from Günther Lange with the title "Contribution to the forming behavior of three-layer austenitic sandwich composite with polymer core material" (TU Clausthal, 2005), an overview of possible joining methods is given: only lap joints with brazing, bonding or laser beam are described. Resistance welding processes or welding processes with a full penetration are not mentioned.

Based on these publications, sandwich panels, which are a combination of two essentially flat metal layers and a non-metallic interlayer, are already known. But the big disadvantage of a not-given resistance-weldability in the initial, semi-finished product and delivery state is not solved. It is not possible for the subsequent, component manufacturing industry to use their existing resistance welding machines or to create a full penetration with linear contact welding methods like laser beam or plasma welding. The disadvantage of this kind of a sandwich panel is that the non-metallic layer isolates electrically metal layers. This makes very difficult to weld the sandwich layers with other materials and to integrate them into multi-material-designed component parts.

SUMMARY OF THE INVENTION

An object of the present invention is to prevent some drawbacks of the prior art and to achieve an improved method for manufacturing a semi-finished sandwich panel with at least two metal layers and at least one non-metallic layer between the metal layers. In the method a mechanical contact between the metal layers is applied by using a three dimensional metal sheet as at least one metal layer and to fill the non-metallic material into the recess spaces formed between the metal layers. Now in a subsequent manufacturing process, like car body engineering, it is possible with the present invention to use a sandwich panel in initial, delivery state directly for a following welding process, especially for resistance welding processes, i.e. the metal layers of the sandwich panel are achieved to be in directly mechanical contact to enable resistance weldability. A further benefit of the present invention is the chosen set-up of the sandwich panel: On the contrary to the state of the art, where a sandwich panel is build up with two (metallic) outer-layers and with two layers of adhesion to bond both outer-layers with the middle-positioned core material, the present invention at the simplest way only uses two metal layers, where one metal layer is essentially flat and the other one metal layer is essentially three-dimensional, and one non-metallic adhesion layer which is filled in the recess spaces between these two metal layers. As a result the sandwich panel of the present invention can be created with a more simple manufacturing line, increased clock-frequency and is cheaper because of saving two layers compared to the state of the art sandwich panels.

In accordance with the present invention a sandwich panel is manufactured from at least two metal layers and at least one non-metallic layer positioned in the recess spaces formed between two metal layers when at least one of the metal layers is shaped being a three dimensional object. The non-metallic composite is filled into the recess spaces formed between two metal layers with a filling degree of at the maximum of 60%, preferably at the maximum of 90%, most preferably at the maximum of essentially 100%. To apply the non-metallic material, one or more fine nozzles are used to guarantee the desired filling degree. A scraper to subtract the non-metallic material from the potential contact areas is possible but not preferred in this invention. The three dimensional metal layer can be optionally heated to at most 80° C. to increase the flow behaviour of the filled-in non-metallic material. An advantageously proved viscosity is round about 10000 mPas. For the sake of clarity, when speaking about the metal layers in this specification, the metal layer being two dimensional is called as the first metal layer and the three dimensional metal layer is called as the second metal layer.

The non-metallic layer according to the invention is positioned essentially in the valley of the second metal layer.

The metallic peaked surface of the second metal layer is essentially in direct mechanical contact with the first metal layer. The direct mechanical contact between the first metal layer and the second metal layer also ensures an electrical contact. The electrical contact further makes possible to have an electric circuit and therefore to join the sandwich panel in order to connect the semi-finished product to a construction of a desired combination of solutions with other sheets, plates or formed parts by resistance spot welding or other welding processes. The form of the three dimensional layer in combination with the chosen non-metallic material and the filling degree of the non-metallic material in the recess spaces formed between the metal layers gives for these panels their mechanical, stiffness, sound, joining and process features.

The first and second metal layers in the manufacture of a sandwich panel according to the invention are advantageously made of the same material, such as stainless steel, carbon steel, copper, aluminium, magnesium, but the first and second metal layers can also be made of different metal materials, different metals or different metal compositions. When using different metals or different metal compositions the combination of these metals can further alter the behaviour of the sandwich panel. For instance, a combination of metals with different thermal expansion coefficients can be advantageous in some solutions of the present invention. By using two metals with two different thermal expansion coefficients can influence the thermal expansion of the sandwich panel, and the surface of the three-dimensional sheet will avoid disruption in the welded areas of the sandwich panel. Further, the sandwich panel of the present invention with two different metal layers can be used as a component bridge in wet-corrosion areas of multi-material designed car bodies. For instance, a foot of a b-pillar is manufactured with stainless steel and a rocker rail is manufactured with aluminium, the sandwich panel can be used as a connection between the two parts. The aluminium side of the sandwich is welded to the aluminium rocker rail and the stainless sandwich layer is welded with the stainless b-pillar. As a result there is no contact corrosion and no electrochemical potential bridge between the different components. The only potential bridge is then in the sandwich, but the non-metallic layer isolates big areas and the residual metallic contact are small (linear or point contact) in comparison to the component size.

The second metal layer in the manufactured sandwich panel of the invention is a corrugated metal piece, a metal piece in the shape of knobs, nubs on the surface of the second metal layer, or any other three dimensional metal piece which is mechanically connectable with the essentially flat two-dimensional first metal layer. Suitable shapes for the second metal layer are found for instance in the WO publication 2014/096180. The form of the second metal layer also determines damping, noise, vibration, stiffness, especially the buckling stiffness, and weldability of the sandwich panel. Nubs and knobs profiled sheets result in a direction independent stiffness but are only suitable weldable with resistance spot welding because of the punctual contact. Corrugated profiled sheets have a direction depending stiffness but enable welding with all continuous welding procedures like resistance roller seam welding because of the linear contact. In the case that the shape of the second metal layer is corrugated and dependent on the solution where the sandwich panel is utilized, the second metal layer can have a shape of an essentially sinusoidal wave, or the second layer can have a shape of a corrugated strip where the two parts of the strip next to each other are in the essentially perpendicular position to each other. Also other shapes of a corrugated strip can be used for the second layer in the sandwich panel manufactured according to the invention.

The non-metallic layer between the two metal layers in the sandwich panel of the invention are advantageously made of polymer material, resin material, cold or thermosetting one or two component adhesive glues, for instance a crash-resistant one component adhesion glue used in the automotive industry or a two component sandwich-adhesion material containing resin and hardener. The essential properties of the non-metallic interlayer are the viscosity during applying and the way of curing and foaming. A good viscosity to reach a defined filling degree without destroying the metallic contact areas is about 10000 mPas. Depending on the non-metallic material a preheating of the non-metallic material before applying can be suitable to reach the right applying viscosity. The way of curing and foaming depends on the chosen adhesion: One way is to use a sealant which reacts in contact with water spray. Another way is to use a temperature reacting two-component adhesion material. Classical sandwich-adhesion material, such as a two component polyurethane adhesive combined with a hardener, is also possible and suitable. After mixing the resin with the hardener, a defined application time is given to apply all sandwich layers.

When manufacturing the sandwich panel in accordance with the method of the invention the second metal layer, consisting of a continuous metal piece or of metal layer elements, is preferably placed in an essentially horizontal position. Naturally any position between an essentially horizontal position and an essentially vertical position can be used. In the case when the second metal layer is placed in an essentially horizontal position the material for the non-metallic layer is embedded into the recess spaces formed between the metal layers on those parts, which parts are at the lower position to the vertical direction of the surface of the second metal layer. The total amount of the material for the non-metallic layer is such that at the maximum of 60%, preferably at the maximum of 90%, most preferably at the maximum of essentially 100% of the recess spaces formed between the metal layers is filled with the material for the non-metallic layer. With a defined filling degree it is possible to vary the weight, stiffness, fatigue, noise and damping properties of the sandwich panel which conform to the desired solution. The upper parts of the surface of the second metal layer in the vertical direction are clean about the non-metallic layer material. This area clean of the non-metallic layer on the surfaces of the second metal layer achieves a mechanical contact between the metal layers in the manufacture of the sandwich panel.

The first metal layer is transferred for the manufacturing of the sandwich panel in accordance with the invention so that the first metal layer is above the second metal layer and thus also above the non-metallic layer. The mutual position between the first metal layer and the second metal layer is advantageously such, that the non-metallic layer is transversely arranged to these two metal layers. A mechanical contact is achieved between the first metal layer and the second metal layer. The mechanical contact is achieved on that area of the upper surface of the second metal layer which is not covered with the non-metallic layer, the uppermost parts of the second metal layer in the vertical direction being able to break the non-metallic layer material or by means of a particular member which is positioned on the upper part of the second metal layer.

The first metal layer and the second metal layer in the sandwich panel of the invention are attached to each other by the combination of bonding and metallic contact so that welding, in order to connect the semi-finished product to a construction of a desired combination of solutions, to other sheets, plates or formed parts will be focused on the points where the first metal layer and the second metal layer has a structural mechanical contact to each other. The mechanical contact between two metal surfaces makes available different kinds of ways to have an electric circuit between those surfaces.

The welding of the first metal layer and the second metal layer, in order to connect the semi-finished product to a construction of a desired combination of solutions, to other metal sheets, plates or formed parts can be carried out as a spot welding, projection welding, buckle plate welding, or roller seam welding as resistance welding processes. Also other welding processes can be utilized such as microplasma welding and laser micro welding as well as seam welding processes such as electron beam welding and laser beam welding.

The sandwich panel in accordance with the invention is further structured so that the sandwich panel can be joined to a desired material piece in order to connect the sandwich panel to a complete structure such as car body. The sandwich panel is used in a subsequent manufacturing process like car body engineering of passenger cars, commercial, agricultural or railway vehicles, especially in wet-area parts or parts like the car roof, cowl/front wall, channel, inlayer of a pillar, front lid or in noise relevant applications like container

BRIEF DESCRIPTION OF THE DRAWINGS

The invention is described in more details referring the following drawings where.

DETAILED DESCRIPTION OF THE INVENTION

Figure 1:
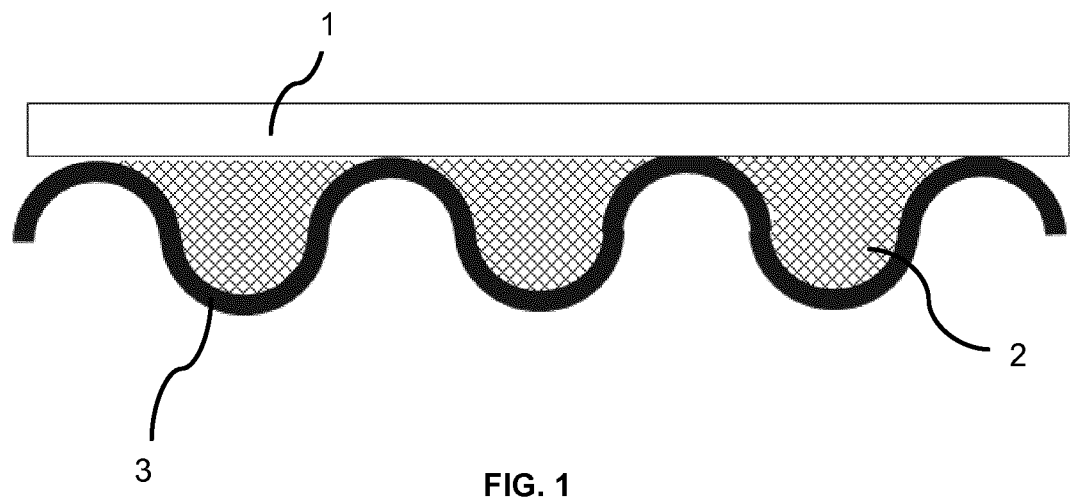
FIG. 1 illustrates one preferred embodiment of the invention in a schematic manner from the side view.

According to the FIG. 1 a flat metal layer 1, a polymer layer 2 and the three dimensional metal layer 3. The polymer layer 2 is positioned in recess spaces formed between the metal layers 1 and 3.

Figure 2:
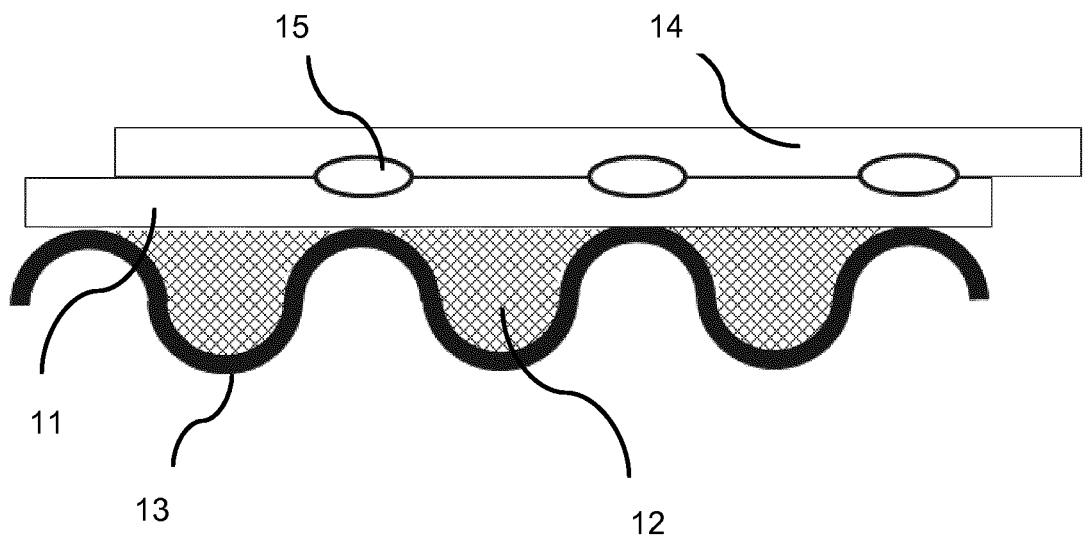
FIG. 2 illustrates one another preferred embodiment of the invention in a schematic manner from the side view.

In FIG. 2 the flat metal layer 11, a polymer layer 12 and the three dimensional metal layer 13 are similar to the layers described in connection with the description of FIG. 1. The sandwich consisting of metal layers 11 and 13 and the polymer layer are welded to a metal sheet 14 by resistance spot welding 15.

The invention claimed is:

1. A method for manufacturing a sandwich panel as a semi-finished product comprising:
   providing a first metallic layer;
   providing a second metallic layer, wherein the second metallic layer is shaped into a three dimensional layer having recesses and raised areas;
   at least partially filling the recesses of the second metallic layer with a non-metallic material while leaving at least a portion of the raised areas free of non-metallic material;
   covering a surface of the second metallic layer in which the recesses have been at least partially filled with non-metallic material with the first metallic layer, such that the non-metallic material is disposed between the first metallic layer and the second metallic layer; and
   bonding the first metallic layer to the second metallic layer,
   wherein the portion of the raised areas of the second metallic layer that is free of non-metallic material and the first metallic layer contact each other to enable resistance weldability of the semi-finished product for connecting the semi-finished product to an at least partially metallic product in a subsequent manufacturing process.

2. The method according to claim 1, wherein the non-metallic layer is positioned in recess spaces formed between the metal layers with variable filling degrees of a maximum of 90%.

3. The method according to claim 1, wherein the second metallic layer is a corrugated metal strip.

4. The method according to claim 1, wherein the second metallic layer is a metal piece in a shape of knobs or nubs on a surface of the second metallic layer.

5. The method according to claim 1, wherein the first metallic layer and the second metallic layer are made of a same metal material.

6. The method according to claim 1, wherein the first metallic layer and the second metallic layer are made of different metal materials.

7. The method according to claim 6, wherein the first metallic layer and the second metallic layer are made of metals with two different thermal expansion coefficients influencing the thermal expansion of the sandwich panel.

8. The method according to claim 1, wherein the first metallic layer and the second metallic layer are made of stainless steel or carbon steel.

9. The method according to claim 1, wherein the first metallic layer and the second metallic layer are made of copper.

10. The method according to claim 1, wherein the first metallic layer and the second metallic layer are made of aluminium.

11. The method according to claim 1, wherein the first metallic layer and the second metallic layer are made of magnesium.

12. The method according to claim 1, wherein the non-metallic material is a polymer material.

13. The method according to claim 1, wherein the non-metallic material is a resin material.

14. The method according to claim 1, wherein the non-metallic material is a cold or thermosetting one or two component adhesive glue.

15. The method according to claim 1, wherein the non-metallic material is a two component sandwich-adhesion material containing resin and hardener.

16. The method according to claim 1, wherein the first metallic panel and the second metallic panel are bonded by welding.

17. The method according to claim 16, wherein the welding is selected from the group consisting of resistance spot welding, resistance roller welding, laser welding, electron beam welding, and micro-plasma welding.

* * * * *